July 13, 1937.  W. H. BAGLEY ET AL  2,086,841
BEARING METAL, BEARING AND METHOD OF PRODUCING SAME
Filed Dec. 15, 1933
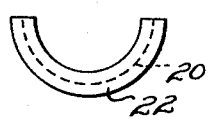
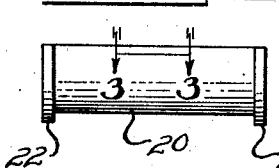
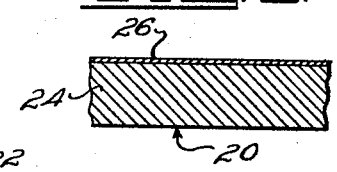
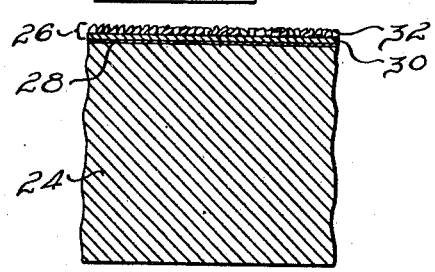
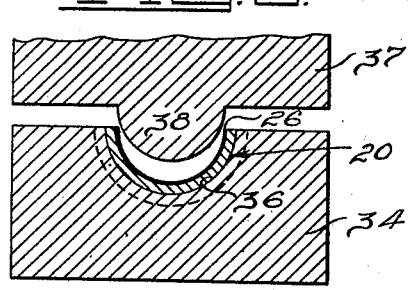
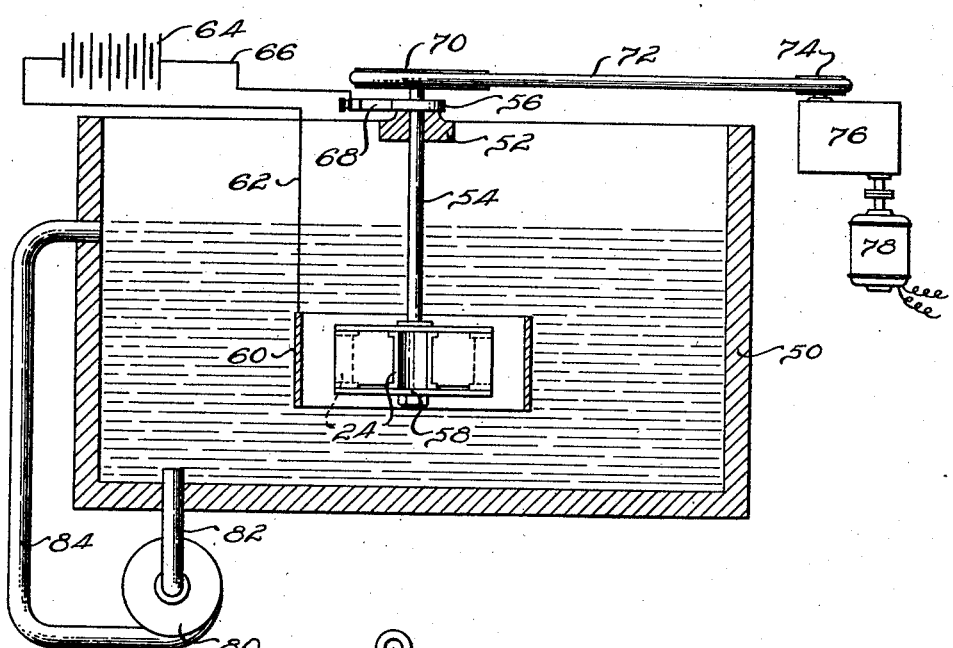
INVENTORS.
William Harold Bagley,
Bruce R. Bagley,
Ralph William Berdan.
BY
Harness, Dickey, Pierce & Hann.
ATTORNEYS.

Patented July 13, 1937

2,086,841

UNITED STATES PATENT OFFICE 2,086,841

BEARING METAL, BEARING AND METHOD OF PRODUCING SAME

William Harold Bagley, Bruce R. Bagley, and Ralph William Berdan, Detroit, Mich., assignors to Bagley Berdan Company, Detroit, Mich., a corporation of Michigan Application December 15, 1933, Serial No. 702,456

5 Claims. (Cl. 204—8)

This invention relates to bearings and methods for making same and particularly so-called plain bearings of the type particularly applicable as main and/or connecting rod bearings for internal combustion engines, the principal object being the provision of a bearing of improved construction as well as simple, economical and efficient methods of producing them.

Objects of the invention include the provision of a bearing including a shell or backing portion of steel or other suitable material and a bearing surface or skin of bearing material applied thereto of no greater thickness than approximately 15/1000 of one inch; to provide a bearing comprising a semi-cylindrical shell or backing member having a relatively thin layer of bearing material electrically deposited upon one surface thereof; the provision of a bearing comprising a semi-cylindrical steel shell or backing member having a relatively thin coating of bearing material intimately joined to a surface thereof by an electro-chemical process; the provision of a bearing comprising a semi-cylindrical shell or backing portion at least one surface of which is provided with a coating comprising an undissolved mixture of two or more metals; the provision of a bearing comprising a semi-cylindrical shell or backing member at least one surface of which is provided with a coating comprising an undissolved mixture of two or more metals at least one of which comprises copper; the provision of a bearing comprising a semi-cylindrical shell or backing member having a surface coating comprising an undissolved mixture of two or more metals uniformly intermingled; and the provision of a bearing comprising a semi-cylindrical shell or backing member having a surface coating comprising an undissolved mixture of two different metals which have been compressed together.

Other objects are to provide a method of making a bearing including the steps of forming a backing member and electrically depositing thereon a coating of bearing material; the step of depositing upon a backing member a coating comprising an undissolved mixture of two or more metals; the step of electrolytically depositing upon a backing member a coating of bearing material and then compacting said coating; and the step of applying to a backing member a coating including copper and at least one additional metal in undissolved association therewith.

Other objects are to provide a method of making bearings including the step of depositing upon a backing member alternate coats of two or more different metals; the step of depositing upon a backing member alternate coats of different bearing metals and then compacting said coats one into the other; the step of depositing upon a backing surface two or more different metals at least one of which is in the form of partially separated granules or crystals which is deposited upon or onto which is deposited another metal; the step of forming a semi-cylindrical backing member, depositing upon a surface thereof two or more different metals at least one of which is at least partially in the form of separated granules or crystals, and then impacting said metals against said backing member whereby to mechanically interlock the different metals deposited thereon; and the step of forming a backing member, electrically depositing upon a surface thereof a coating comprising two or more different metals, and then heating said backing member and coating to at least partially melt one of the metals forming said coating.

Further objects are to provide a method of forming bearings including the step of simultaneously depositing electrolytically upon the surface of a backing member two or more different metals; the step of subjecting a backing member to an electrolytic bath having as constituents thereof different elements which will deposit two or more different metals on the backing member from the bath; and the step of simultaneously depositing upon the backing member for a bearing by an electrolytic process such quantities of different bearing materials as when intimately mixed in the desired proportion will form a bearing surface of the desired characteristics.

A still further object is to provide a bearing material comprising a homogeneous mixture of two or more finely divided metals of materially different melting points.

The above being among the objects of the present invention, the same consists in certain novel material, steps of operation and articles produced thereby as hereinafter described with reference to the accompanying drawing, and then claimed, having the above and other objects in view.

In the accompanying drawing which illustrates a suitable embodiment of the present invention and in which like numerals refer to like parts throughout the several different views, Fig. 1 is an end view of a type of bearing to which the present invention is particularly applicable.

Fig. 2 is a side elevational view of the bearing shown in Fig. 1.

Fig. 3 is an enlarged fragmentary sectional view taken on the line 3—3 of Fig. 2 and illustrating the relative thickness of bearing metal that is preferably employed in accordance with the present invention.

Fig. 4 is a view similar to Fig. 3 but enlarged thereover in order to better illustrate one feature of the present invention.

Fig. 5 is a vertical sectional view taken centrally through a die mechanism employed for compacting the bearing metal in accordance with the present invention.

Fig. 6 is a more or less diagrammatic vertical sectional view taken centrally through an electroplating apparatus illustrating in a more or less diagrammatic manner a type of apparatus that may be advantageously employed in connection with one phase of the present invention.

It is conventional practice in connection with internal combustion engines to provide bearings for the crank shaft and large ends of the connecting rods by forming semi-cylindrical bearing members and inserting them in recesses suitably provided for their reception. Such bearing members are commonly called bearings and comprise a main body usually called a shell or backing member, usually made of brass or steel but which may be made of any suitable material, and to the bearing face of which is applied a layer of suitable bearing material such as babbitt or the like. Also in conventional practice the shell or backing member is first tinned on the face which is to receive the layer of bearing material and the bearing material is then cast onto this face, the tinning of the shell or backing member causing the bearing material to be intimately secured thereto. Because of the method of application of the bearing material to the shell or backing member, it has been necessary in order to get the required uniformity of product and proper bonding between the bearing member and the shell or backing member to provide a thickness of bearing metal on the shell or backing member of $\frac{3}{32}$ of an inch or greater. This thickness of bearing metal on the shell or backing member is undesirable for several reasons among which is that the bearing material is relatively more expensive than the material from which the shell or backing member is made, that the bearing material is usually of softer nature than the material from which the shell or backing member is formed and consequently the thicker the coating of bearing material the more easily it is pounded out of true form by the forces transmitted to it through the journal which it supports, and further that such a thickness of bearing material is not required due to the fact that when such a bearing has become worn or pounded out to such an extent that it provides a clearance of 15/1000 of an inch or less for the journal which it supports, equivalent to a reduction of 7.5/1000 of an inch in the thickness of the bearing metal, replacement of the bearing is necessary for the safe operation of the engine as well as to reduce the noise of operation thereof. In accordance with the present invention a bearing is provided in which the thickness of bearing material employed is preferably not greater than 15/1000 of one inch and which, accordingly, eliminates those disadvantages of conventional types of bearings in which a greater thickness of bearing material has heretofore been necessitated.

In the production of conventional types of bearings in the manner above explained, it has been found necessary to apply to the shell or backing member a greater thickness of bearing material than that required in the finished product so as to provide stock for removal during a finishing operation in order to produce the desired true and accurate bearing surface thereon. The amount of extra stock added for such finishing operation in many cases is wasted. In accordance with one phase of the present invention only enough metal for the required finished bearing is preferably applied to the shell or backing member, and although in its initial stages it may be of a greater thickness than that required in the finished product the thickness may be reduced to that required and the desired finish applied thereto by a compacting or compressing operation which not only imparts the desired size and state of finish to the article but further acts to improve the characteristics of the bearing material during the operation.

The bearing material in accordance with the present invention is applied to the shell or backing member by an electrolytic process, that is, the bearing material is electrically plated upon the shell or backing member. By this means not only may a relatively thin coating of bearing material be applied to the shell or backing member but it is applied thereto in such a manner as to cause a thoroughly reliable bond between it and the backing member.

The bearing materials most commonly employed in connection with bearings of the above described type at the present time are composed chiefly of babbitt which in the better class of bearings is composed mainly of lead and tin in varying proportions. It is well recognized that the quality of such bearing material could be considerably enhanced if it were possible to alloy the tin and/or lead with a considerably harder metal or to provide a bearing material comprising a mixture of tin and/or lead with a harder material in which the different materials were homogeneously mixed and in a finely divided state. As an example, it is recognized that it would be desirable to include a relatively large percentage of copper, iron or other metal of similar hardness and properties with the lead and/or tin, but it is practically impossible at the present time to alloy more than a small percentage of copper or iron, in the neighborhood of 2½ or 3 per cent with lead, and that where it is attempted to alloy greater percentages of these metals with lead or tin any amounts of the metals added over the percentages stated segregate out in globules the size of which and uniformity of admixture of which throughout the body of the material is impossible of control. The present invention provides a bearing material which may comprise tin and/or lead with one or more harder metals, with any desired percentage of the constituent metals, and in which there is an even and homogenous dispersion of the various metals throughout the bearing material.

Referring now to Figs. 1 and 2, a bearing half is shown therein of the type to which the present invention is particularly applicable and which is of the type commonly employed in connection with the crank shaft and large ends of the connecting rods of internal combustion engines. As indicated in these figures, such bearing halves or, as they are more simply called, bearings, comprise a semi-cylindrical body portion of uniform wall thickness throughout substantially their entire length and provided at opposite ends with radially projecting circumferentially extending flanges 22, these flanges being provided primarily to afford a means for fixing the bearings in their supports against axial displacement relative thereto. These bearings, as previously mentioned, comprise a shell or backing member of the general shape of the bearings shown in Figs. 1 and 2 to the inner surface of which a layer or coating of bearing material is applied. This is generally indicated in Fig. 3 in which the shell or backing member is indicated at 24 and the coating of bearing material at 26. It will be noted from Fig. 3, which is a materially enlarged sectional view, that in accordance with the present invention the thickness of the coating 26 is extremely small as compared to conventional practice, in fact, particularly where the bearings are to be employed in internal combustion engines for motor vehicles or the like, we prefer that the coating 26 be of no greater thickness than $15/1000$ of one inch. The shell or backing member 24 may be of any suitable material such as steel or brass, steel being preferable because of its cheapness. In accordance with one phase of the present invention the coating 26 is formed of a mixture of either lead or tin with one or more harder metals, preferably copper or iron, this bearing material being a mixture of the various constituents thereof as differentiated from an alloy thereof, it being generally understood that the word "alloy" relates only to materials in which one or more metallic elements have been dissolved in or by another metallic element. Accordingly, it will be understood that according to the present invention no alloying of the elements forming the bearing material occurs, at least prior to the application of the material to the shell or backing member.

In carrying out the process of making a bearing in accordance with the present invention, particularly where the shell or backing member 24 is formed of iron or steel, it is preferably first given a coating, preferably a flash coat of copper by an electrolytic process, the reason being that most electrolytically deposited metals are found to adhere better to a copper surface than, for instance, a steel surface, although copper in particular may be so caused to firmly adhere to an iron or steel surface. Accordingly, although it may not be necessary in all cases, the shell or backing member 24 is preferably first given a coating of copper in order that the finished bearing coating may properly adhere to the shell or backing member. After the shell or backing member is thus provided with a coating of copper, when such coating is employed in the process, it is then subjected to a suitably electrolytic process in order to cause a suitable layer of bearing material to be applied thereto. This layer of bearing material is, of course, preferably applied only to that face of the shell or backing member 24 which is to provide a bearing surface for a rotatable part to be received therein and, accordingly, any conventional means or method may be employed for preventing a deposit of such material on any surfaces of the shell or backing member except that desired. Such means may comprise a coating of paraffin, lacquer or other suitable material such as that conventionally employed in the electroplating art.

Instead of employing the process described in connection with Fig. 5, the bearing may be subjected to a different treatment. The shell or backing member 24 in this instance is also first plated with copper when formed from iron or steel and in such case it is then heated in a suitable atmospheric controlled furnace so as not only to normalize the shell or backing member to relieve it of the strains set up in it during its forming process, but also to melt the copper and allow it to become brazed uniformly to the shell or backing member so as to provide a good bond for subsequent coatings. The copper plated shell or backing member is then suitably cleaned and subjected to a suitable electrolytic bath or baths until the desired thickness of bearing material is built up thereon. The bearing thus far formed may then be subjected to the operation described in connection with Fig. 5 or it may be placed in a suitable atmospheric controlled furnace and heated until that element of the bearing material of lower melting point begins to melt or actually does melt. This may not only cause a stronger bond to exist between the various elements of the bearing material and between the bearing material and the shell or backing member 24, but additionally may effect a partial or even complete alloying of the various elements, particularly when they are present in proportions permitting such an effect.

There are two general methods which may be employed in connection with the present invention for applying the coating 26 to the shell or backing member 24. The first of these methods may be accomplished by the use of methods and apparatus already well known in the art and consists of applying alternate layers of the metal desired in the bearing material to the proper face of the shell or backing member. Where, for instance, it is desired to form the bearing material of lead and copper the backing member 24 may be first immersed in a lead plating solution and subjected to the action of an electric current until a layer of lead has been plated on the surface. This may be followed by a layer of copper by subjecting the shell or backing member to an electrolytic action in a copper plating solution. If it is desired to include a third metal in the bearing material the copper coating may be followed by a layer of such material by suitably subjecting it to the effect of an electrolytic action in an electrolytic bath of such material. If desired, at this point these steps may be repeated until a sufficient thickness of these materials has been built up on the shell or backing member 24 to form the desired coating 26.

There are, of course, various ways by which the above described method may be carried out. For instance, the alternate layers of different materials may be applied in relatively thin and smooth coats by employing a relatively low current density in the plating operation. On the other hand, where this method is employed, we prefer to use the method described in connection with Fig. 4 in which the shell or backing member is indicated at 24, the flash copper coating at 28 and the bearing coatings collectively at 26. In this particular instance a coating 30 of tin or lead is first applied directly to the flash coating 28. This is followed by a coating 32 of copper but in this particular instance a relatively high current density is employed in depositing the copper layer 32 so that the copper assumes, at least in part, the appearance of a rough surface which, upon magnification, is seen to comprise largely separated or partially separated individual grains or crystals of copper. If desired, additional alternate coatings of these materials may be applied but in any case after the required thickness of the coating 26 is provided, taking into consideration the thickness required for carrying out the ensuing operation which will now be described, the bearing is now placed in a die such as 34 having a recess 36 therein which is complementary to the desired size, shape and contour of the outer surface of the bearing 20. The die 34 is provided with a cooperating ram 37 provided thereon with a projection 38 of the desired size, shape and contour of the inner or bearing surface of the bearing, and the ram 37 is forced under a relatively high pressure into the bearing 20 and forced home therein. This causes the separate grains or crystals of the copper coating 32 to penetrate into and become embedded in the lead or tin coating 30, so as to mechanically intermix and lock such crystals in a matrix of lead or tin and at the same time imparts to the bearing surface a relatively high finish which, in many cases, may be employed in the identical condition which results from this operation and causes such surface to exactly conform to the size, shape and contour of the outer surface of the projection 38.

Obviously, this same method last described may be employed where the alternate coatings of metals combining to form the bearing material are deposited in place as relatively thin and smooth coatings as even in such cases it is generally recognized that the granular or crystalline condition of the metals exists, although less obvious to the naked eye because of the smaller size of the grains or crystals in such cases.

The second method of applying the bearing material to the proper surface of the shell or backing member 24 is the method which it is preferred to employ and this method comprises depositing the various desired constituent elements of the bearing material simultaneously upon the shell or backing member 24. This is accomplished by providing a suitable electrolytic bath in which suitable salts or other compounds of the desired elements of the bearing material are all present, and then suitably subjecting the shell or backing member 24 to an electric current so as to cause the various desired metallic elements to be simultaneously plated out upon it. By this method and because of the fact that in an electroplating process the metal is deposited in the form of extremely fine particles, a homogeneous and intimately mixed product of the various metallic elements will result that, to all intents and purposes, is equivalent to an alloy of such elements. Furthermore, by this method any desired proportions of the various elements may be obtained, for instance, the bearing material may be composed of equal parts of either lead or tin with either copper or iron, and with a homogeneous and equal dispersion of the two metals throughout, a condition which it is impossible to obtain by attempting to alloy such proportions of these metals. At the same time the method is one which permits of accurate control at all times and permits any desired proportion of the metals to be obtained and maintained in production.

A preferable bearing composition formed in accordance with the above method is one which comprises 40 to 60 per cent of either lead or tin and 60 to 40 per cent of either copper or iron. The invention is not to be considered as limited to such proportions, however, as bearing compositions within the range of 20 to 80 per cent of either tin or lead and 80 to 20 per cent of either copper, iron or other suitable metal of equally hard characteristics is satisfactory for use, particularly under certain conditions.

It is not to be understood that the invention herein described and claimed is broadly limited to the step of compressing or compacting the coating of bearing material in the manner described in connection with Fig. 5 for it will be apparent that the bearings formed as thus far described by either of the two above mentioned methods, and whether or not the coating of bearing material has been compacted by an apparatus such as that described in connection with Fig. 5 or not, sufficient stock may be provided in applying the coating 26 to permit the bearing to be subjected to a finished machining operation the same as in conventional methods in order to obtain the correct size and finish for the bearing surface.

The methods and/or materials employed in providing the coating 26 in accordance with the present invention requires special consideration. It is our understanding that attempts have heretofore been made to simultaneously plate two different metals, and particularly lead or tin and iron or copper, but such attempts have been unsuccessful in so far, at least, as any control thereover is concerned sufficiently accurate to warrant its employment in quantity production. Where alternate layers of various metallic elements are to be applied to the shell or backing member 24 to form the coating 26 as in the first described method, the following electrolytic baths may be employed.

For lead, employing a current density ranging from 15 to 30 amperes per square foot of surface being plated, the following amounts of material per litre of water:

| | Grams |
|---|---|
| Hydrofluoric acid | 240 |
| Boric acid | 116 |
| Lead carbonate | 145 |
| Glue | .2 |

The bath may be operated at room temperature.

For tin, employing a current density of from 5 to 10 amperes per square foot of surface being plated, the following amounts of material per litre of water:

| | Grams |
|---|---|
| Stannous chloride | 3 |
| Sodium carbonate | 75 |
| Sodium cyanide | 7 |

The bath is preferably operated at a temperature of from 150° to 170° F.

For copper, employing a current density of from 10 to 30 amperes per square foot of surface being plated in the case of a sulphate bath and 10 to 15 amperes per square foot of surface being plated when employing a cyanide bath, the following amounts of material per litre of water:

*Sulphate bath*

| | Grams |
|---|---|
| Copper sulphate | 196 |
| Sulphuric acid | 65 |

The bath is preferably operated at a temperature of around 115° F.

*Cyanide bath*

| | Grams |
|---|---|
| Copper cyanide | 27 |
| Sodium cyanide | 35 |
| Sodium carbonate | 10 |

The bath is preferably operated at a temperature of from 100° to 110° F.

For iron, employing a current density of from 40 to 100 amperes per square foot of surface being plated, the following amounts of material per litre of water:

| | Grams |
|---|---|
| Ferrous chloride | 450 |
| Calcium chloride | 500 |

The bath is preferably operated at a temperature of around 125° F.

Where lead and copper are to be simultaneously deposited upon the shell or bearing member 24 from a single bath and where these elements are desired in substantially equal proportions we find that one suitable composition of bath or electrolyte may be obtained by the use of fluoboric acid as the solvent or acid of the bath and that such bath may be obtained by mixing together the following constituents in the relative proportions stated. 116 grams of boric acid ($H_3BO_3$) and 240 grams of hydrofluoric acid (HF) is mixed with one litre of water. To 500 cc. of the above solution 70 grams of basic lead carbonate $PbCO_3.Pb(OH)_2$ is added. To the remaining 500 cc. of acid solution 50 grams of copper carbonate ($CuCO_3$) is added. The exact amount of these last mentioned salts to be added, of course, depends upon the desired analysis of the bearing metal. The anode employed is of a mixture of copper and lead and is preferably of cast construction for the reason that lead, because of its high position in the electromotive series, tends to displace the copper from the solution and would otherwise in a short time prevent the copper from being plated out. The anode preferably includes in addition a small amount, for instance, two to three per cent by weight, of nickel as this assists in keeping the anode from becoming corroded. It is also preferable to add about .2 of a gram of glue to the above solution and continue to add a small amount during operation of the bath for the purpose of insuring a smooth homogeneous deposit of the bearing metal and to eliminate any tendency to form "trees" in the structure of the deposit. The shell or backing member to be plated should, of course, be perfectly clean on the surface to be plated and where formed of iron or steel preferably provided with a copper coat as previously described. The bath itself should be operated at about 85 to 125 degrees F. and should be agitated during the plating operation in any suitable or conventional manner. The current density employed is preferably rather low, namely ten to fifteen amperes per square foot of surface to be plated.

Another suitable electrolytic bath may be provided which may be identical to the above described bath except that the hydrofluo boric acid may be replaced by an equivalent amount of fluosilicate, the concentration of the salts being substantially the same. A peculiarity of this bath is that while the article being plated is at rest only lead will be deposited upon it, while if it is rapidly moved in the bath copper only will be deposited upon it. Accordingly, this bath may be employed in connection with the method first described in which first one layer of one element is applied to the shell or backing member and is followed by another layer of another material, simply by allowing the article to remain at rest for a given length of time in the bath and then rapidly moving it, and repeating the operations. The temperature of this bath should be substantially the same as that previously described for plating both lead and copper from a single bath but we have found that better results will be obtained in the current density of 15 to 20 amperes per square foot of surface being plated is employed while lead only is being deposited, and a slightly lower current density where the copper only is being deposited. If the article being plated is moved in the bath at a speed less than that at which only copper is plated out, then a mixture of both copper and lead may be simultaneously deposited. With a bath of the above proportions we have found that if the cathode (the article being plated) is moved in the bath at such a rate that a square inch of its surface displaces an area of approximately eleven square inches per minute, and at a current density of approximately .2 of an ampere per square inch of surface being plated, an equal amount of copper and lead will be simultaneously deposited upon the cathode. Obviously, by varying the speed of movement of the cathode in the bath the proportional amounts of the two metals being deposited may be varied thereby and thus the composition of the composite bearing material being controlled in this manner.

In order to avoid the expense of heating the two previously mentioned lead-copper baths and also to lessen the effects of evaporation thereof, the following bath is preferably employed: One (1) litre of $HBF_4$ (fluoboric acid) is made up by dissolving 240 grams of HF and 116 grams of boric acid ($H_3BO_3$) in one (1) litre of water. To this is added 105 grams of basic lead carbonate ($PbCO_3.Pb(OH)_2$) and 85 grams of copper carbonate ($CuCO_3$), and preferably two-tenths (0.2) grams of glue and 2 grams of potassium chlorate ($KClO_3$).

The bath may be operated at room temperature. A current density of approximately 20 amperes per square foot of surface being plated is preferably employed. The potassium chlorate is preferably employed to avoid the formation of hydrogen bubbles on the cathode. Any suitable water soluble oxidizing agent as, for instance, a chlorate or a permanganate, which will combine with the free hydrogen given off at the cathode, may be employed for this purpose. The glue is preferably added for the same reasons previously given. Either the anode or cathode is preferably rotated.

Where lead and iron are to be simultaneously deposited upon the shell or backing member a bath formed in accordance with the following amounts of materials may be employed per litre of water:

240 grams of HF
116 grams of $H_3BO_3$
100 grams of $PbCO_3.Pb(OH)_2$
.2 gram of glue
250 grams of $FeCO_3$ (ferrous carbonate)

In this case the bath is preferably maintained at a temperature of approximately 150° F. and a current density of approximately 30 amperes per square foot of surface being plated is preferably employed.

Where tin is to be employed in place of lead and is to be employed with copper, an electrolytic bath having approximately the following amounts of materials therein per gallon of water may be satisfactorily employed for simultaneously plating both of these metals upon the cathode.

| | Ounces |
|---|---|
| Copper cyanide | 2 |
| Sodium cyanide | 4½ |
| Sodium carbonate | 12 |
| Stannous chloride | ¼ |

This bath is preferably operated at a temperature of from 110° F. to 150° F. and with a current density of around 10 amps./sq. ft.

Where the bearing material is to comprise tin and iron in approximately equal proportions, the following bath may be employed for simultaneously depositing these two metals upon the cathode, the amounts stated being that required per litre of water:

| | Grams |
|---|---|
| Stannous chloride | 2 |
| Sodium cyanide | 7.5 |
| Sodium carbonate | 75 |
| Ferrous chloride | 200 |

This bath is preferably operated at a current density of approximately 20 amps./sq. ft. at a temperature of from 110° F. to 160° F.

As previously described, when a sufficient thickness of material for the bearing surface of the bearing has been built up by any of the described methods the bearing is, of course, removed from the bath and after being washed may be subjected to an operation such as that described in connection with Fig. 5, or it may be placed in a suitable furnace to cause fusing and/or alloying of the various constituents of the bearing material.

As a matter of illustration only, there is illustrated in Fig. 6 in a more or less diagrammatic manner apparatus by means of which the above described baths requiring movement of the cathode in order to obtain the desired simultaneous platings of two or more elements, may be obtained. Referring to this figure a plating tank of conventional construction is illustrated at 50. This tank may, of course, be assumed to be filled with the particular bath or electrolyte necessary for the desired operation. A cross bar 52 is shown as being supported across the top of the tank 50 and centrally through which extends the vertically rotatable supporting shaft 54 provided above the cross bar 52 with a suitable thrust collar 56. The lower end of the shaft 54 is provided with a suitable support 58 upon which is secured a plurality of shells or backing members 24 with the surfaces thereof to be plated facing radially outwardly. An anode 60, shown as a matter of illustration as of ring-like form suitably supported in the tank 50 concentrically with the shaft 54 and in horizontal alignment with the shells or backing members 24, is connected by a suitable lead 62 with a suitable source of electric current diagrammatically illustrated as at 64. The shells or backing members 24 forming the cathode are electrically connected through the support 58, shaft 54 and thrust ring 56 with the opposite side of the source 64 by means of a lead 66 and brush 68 in rubbing contact with the thrust collar 56. The upper end of the shaft 64 is shown as being provided with a pulley 70 which is drivingly connected by a belt 72 with a pulley 74 driven from a gear reduction device 76 and which in turn is driven by an electric motor 78. By such means the anode may be moved in the bath at the desired speed and subjected to the proper electrolytic action therein.

Suitable means are preferably provided for agitating the electrolytic bath and as a matter of illustration this may consist of a motor driven pump such as 80 having its intake side connected by a pipe 82 with the interior of the tank 50 adjacent the bottom thereof, and having its outlet side connected by a pipe such as 84 with the interior of the tank 50 adjacent the level of the electrolyte therein.

It is not to be understood from the above description that the present invention is limited in its broader aspects to bearings of the removable shell type, as it will be obvious that where the bulk of the member or article to be provided with a bearing surface permits, the bearing metal may be deposited directly thereon without the use of a separate shell or backing member of the specific type hereinbefore described. As a matter of illustration the connecting rod 86 illustrated in Fig. 7 may have the bearing metal deposited directly thereon without the use of an additional shell or backing member. If it is assumed that the opening 88 in the big end of the connecting rod 86 in which the pin of a crank shaft (not shown) is adapted to be received is to be provided with a bearing surface, the rough opening in the rod may first be brought to the desired size, as by boring or reaming it out when the cap 90 is secured in place, or by any other suitable or conventional means, the cap 90 removed, and the main body of the rod 86 and the cap 90 separately treated to provide a layer 92 of bearing material thereon in exactly the same way as heretofore described in connection with a separate shell or backing member.

From the above it will be apparent that the above described article, material, and solutions for electrolytic baths are but specific instances of the broad application of the invention herein involved, and that with the above disclosure those skilled in the art may expand and broaden the field of uses of the method and change the article, material and electrolytic solution to best fit the particular problem to which the invention is to be applied and, accordingly, it will be readily understood that formal changes may be made in the specific embodiments of the invention described without departing from the spirit or substance of the broad invention, the scope of which is commensurate with the appended claims.

What is claimed is:

1. The method of forming a bearing including forming a shape maintaining backing member, and electrolytically depositing thereon a bearing material by subjecting said backing member, as a cathode, to the effects of an electrolytic bath containing salts of one element of a class of metals consisting of lead and tin and of one element of a class of metals consisting of iron, and fluo-boric acid, to form a bearing surface.

2. The method of forming a bearing including forming a shape maintaining backing member, and electrolytically depositing thereon a bearing material by subjecting said backing member, as a cathode, to the effects of an electrolytic bath containing salts of one element of a class of metals consisting of lead and tin and of one element of a class of metals consisting of copper and iron, and fluosilicate, and moving said backing member in said bath during the electroplating process at such speed as to cause each square inch of cathode area to be plated to displace an area of from 10 to 35 square inches per minute.

3. The method of forming a bearing including a backing member, and electrolytically depositing thereon a bearing material to provide a bearing face therefor by subjecting said backing member, as a cathode, to the effects of an electrolytic bath containing salts of one element of a class of metals consisting of lead and tin and of one element of a class of metals consisting of iron, and a fluosilicate.

4. The method of forming a bearing including forming a shape maintaining backing member, and electrolytically depositing thereon a bearing material to form a bearing surface, by subjecting said backing member, as a cathode, to the effects of an electrolytic bath containing salts of one element of a class of metals consisting of lead and tin and of one element of a class of metals consisting of copper and iron, and fluosilicate, and moving said backing member in said bath during the electroplating process at such speed that the said elements will be deposited simultaneously on the cathode in the proportions desired.

5. The method of forming a bearing including forming a shape maintaining backing member, and electrolytically depositing thereon a bearing material to form a bearing surface, by subjecting said backing member, as a cathode, to the effects of an electrolytic bath containing salts of one element of a class of metals consisting of lead and tin and of one element of a class of metals consisting of copper or iron, and fluosilicate, and holding said backing member stationary in said bath so that one element of one of said classes of metals will be deposited thereon, and then rapidly moving said backing member in said bath so that one element of the other of said classes of metals will be deposited thereon, and then moving said backing member at a predetermined intermediate rate so that elements of both of said classes of metals will be deposited thereon in predetermined proportions.

WILLIAM HAROLD BAGLEY.
RALPH WILLIAM BERDAN.
BRUCE R. BAGLEY.